(12) United States Patent
Jannick et al.

(10) Patent No.: US 7,210,301 B2
(45) Date of Patent: May 1, 2007

(54) USE OF 1,1,1,3,3-PENTAFLUOROBUTANE AS A REFRIGERANT IN A TURBOCOMPRESSOR COOLING SYSTEM

(75) Inventors: Peter Jannick, Hannover (DE); Christoph Meurer, Hannover (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 10/783,037

(22) Filed: Feb. 23, 2004

(65) Prior Publication Data

US 2004/0226303 A1  Nov. 18, 2004

Related U.S. Application Data

(63) Continuation of application No. PCT/EP02/08177, filed on Jul. 23, 2002.

(30) Foreign Application Priority Data

Aug. 23, 2001 (DE) ................ 101 41 447

(51) Int. Cl.
C09K 5/04 (2006.01)
C09K 5/00 (2006.01)
(52) U.S. Cl. .......................... 62/114; 252/67
(58) Field of Classification Search ................ 62/114, 62/77, 86, 401; 252/67
See application file for complete search history.

(56) References Cited

U.S. PATENT DOCUMENTS

| 5,076,064 | A | * | 12/1991 | Kopko | .................. | 62/77 |
| 5,662,825 | A | * | 9/1997 | Bivens et al. | ............ | 252/67 |
| 6,526,764 | B1 | * | 3/2003 | Singh et al. | ............ | 62/84 |
| 6,660,709 | B1 | * | 12/2003 | Dournel et al. | ......... | 510/461 |
| 6,814,884 | B2 | * | 11/2004 | Jannick et al. | ......... | 252/67 |

FOREIGN PATENT DOCUMENTS

| JP | 2002226839 | * | 8/2002 |
| WO | 93/02150 | | 2/1993 |
| WO | 00/36046 | | 6/2000 |

OTHER PUBLICATIONS

Nick Campbell et al., "Coping Without the Common Coolant", Chemistry and Industry Chemistry and Industry Review, Chemical Society. Letchworth, No. 7, Apr. 5, 1999, pp. 262-263, 266-267.

* cited by examiner

*Primary Examiner*—William C. Doerrler
(74) *Attorney, Agent, or Firm*—Crowell & Moring LLP

(57) ABSTRACT

The use of 1,1,1,3,3-pentafluorobutane (R365mfc) as refrigerant in turbocompressor cooling systems, which, due to their construction, can achieve high outputs with a small space and material requirement. Such systems used in high-performance commercial and industrial refrigeration units.

10 Claims, No Drawings

USE OF 1,1,1,3,3-PENTAFLUOROBUTANE AS A REFRIGERANT IN A TURBOCOMPRESSOR COOLING SYSTEM

CROSS REFERENCE TO RELATED APPLICATIONS

This application is a continuation of international patent application no. PCT/EP02/08177, filed Jul. 23, 2002, and published in German as WO 03/018707, the entire disclosure of which is incorporated herein by reference. Priority is claimed based on Federal Republic of Germany patent application no. DE 101 41 447.1, filed Aug. 23, 2001.

BACKGROUND OF THE INVENTION

The invention relates to the use of a refrigerant in turbocompressors.

Following the discovery of the ozone-damaging effect of chlorofluorocarbons (CFCs), such as R11, R12, R114, and chlorofluorohydrocarbons (HCFCs), such as R22 and R123, in the 1970s, with the Montreal Protocol an agreement was signed in 1987 to replace these substances with other refrigerants. Further international and national secondary legislation shortened the agreed phasing-out terms for these substances. For this reason, it was necessary to search for suitable substitutes which can replace CFCs and HCFCs in present applications.

The use of R365mfc as blowing agent or refrigerant is known, but its application as refrigerant in turbocompressors has not been described hitherto.

SUMMARY OF THE INVENTION

The object of the invention is to provide a novel refrigerant for turbocompressors which can also be used as a substitute refrigerant for R11 or R123.

According to the invention, this object is achieved by the use of R365mfc in turbocompressors.

In particular, the object of the invention is achieved by providing a method of cooling a material, the method comprising compressing 1,1,1,3,3-pentafluorobutane as refrigerant in a turbocompressor, and allowing the compressed 1,1,1,3,3-pentafluorobutane to expand in heat exchange relation with the material to be cooled.

In accordance with a further aspect, the object of the invention is achieved by providing a method of converting a cooling system including a turbocompressor which uses R11 or R123 as a refrigerant, the method comprising replacing the R11 or R123 with 1,1,1,3,3-pentafluorobutane.

In yet another aspect of the invention, the object is achieved by providing a cooling system comprising a turbocompressor which compresses a refrigerant, in which the refrigerant comprises 1,1,1,3,3-pentafluorobutane, and particularly by providing a cooling system in which the turbocompressor is designed to operate with R11 or R123 as the refrigerant, and in which the refrigerant consists of 1,1,1,3,3-pentafluorobutane.

A comparison of the characteristic substance data of various refrigerants is shown in Table 1.

TABLE 1

| Refrigerant | Chemical formula | Molecular weight | Boiling point at 1.013 bar (° C.) | Critical temperature (° C.) |
|---|---|---|---|---|
| R11 | $CCl_3F$ | 137.37 | 23.8 | 198.0 |
| R12 | $CCl_2F_2$ | 120.91 | −29.8 | 111.8 |
| R22 | $CHClF_2$ | 86.47 | −40.8 | 96.2 |
| R123 | $CHCl_2CF_3$ | 152.39 | 27.9 | 183.7 |
| R245fa | $CF_3$—$CH_2$—$CHF_2$ | 134.0 | 15.3 | 157.5 |
| R245ca | $CH_2F$—$CF_2$—$CHF_2$ | 134.0 | 25.0 | 174.4 |
| R365mfc | $CF_3$—$CH_2$—$CF_2$—$CH_3$ | 148.0 | 40.2 | 193.0 |

Turbocompressors in the field of refrigeration engineering are exclusively of radial construction. They are distinguished e.g. by a low power to weight ratio, small bulk and low susceptibility to failure.

It is likewise known that substances having a high relative molecular weight are suitable as refrigerants for turbocompressors, since a lower head and hence frequently a lower number of stages are required in order to reach a given compression ratio than for a substance with a lower relative molecular weight.

Typical refrigerants for turbocompressors include, for example, trichlorofluoromethane (R11), dichlorodifluoromethane (R12), chlorodifluoromethane (R22), 1,2-dichlorotetrafluoroethane (R114) or dichlorotrifluoroethane (R123). The use of 1,2,2,3,3-pentafluoropropane and 1,1,1,3,3,3-hexafluoropropane as refrigerant in turbocompressors has been described in EP 0 595 937 and U.S. Pat. No. 5,662,825, respectively.

The specifications of the turbocompressors are determined, inter alia, by the type of refrigerant. Usually, the turbocompressors are designed based on the necessary, known or still to be determined properties of the selected refrigerant.

The molecular weight of R365mfc is comparable to that of R11 and R123. Due to its comparable properties, R365mfc can be used instead of R11 or R123 in turbocompressors.

The following simplified evaluation of the refrigerants by considering the speeds required to develop pressure for an adiabatic turbocompressor is intended to explain, but not restrict, the invention.

The torque M applied without loss to the fluid by the blades is:

$$M = \dot{m} \cdot c_{2u} \cdot r_2 - \dot{m} \cdot c_{1u} \cdot r_1$$

$$M = \dot{m}\,(c_{2u} \cdot r_2 - c_{1u} \cdot r_1) \qquad (1)$$

in which:
$\dot{m}$—is the mass flow of the refrigerant in kg/s
$c_{2u}$—is the tangential velocity of the refrigerant at the outlet in m/s
$r_2$—is the radius of the blades at the outlet in m
$c_{1u}$—is the tangential velocity of the refrigerant at the inlet in m/s
$r_1$—is the radius of the blades at the inlet in m When the refrigerant enters the turbocompressor without vortical motion ($\alpha=90°$), then:

$$c_{1u}=c_1 \cdot \cos \alpha = c_1 \cdot \cos 90° = 0$$

This yields:

$$M = \dot{m} \cdot c_{2u} \cdot r_2 \qquad (2)$$

The power required at the shaft of the turbocompressor is calculated as:

$$P = M \cdot \omega \qquad (3)$$

in which:
$\omega$—angular velocity
M—torque of the turbocompressor
It follows from (2) that:

$$P = \dot{m} \cdot c_{2u} \cdot r_2 \cdot \omega \qquad (4)$$

On the assumption that the impeller speed and the tangential velocity of the refrigerant at low refrigerant through-flow rates are virtually identical, one therefore obtains:

$$c_{2u} = r_2 \cdot \omega \qquad (5)$$

and with (4) it follows that:

$$P = \dot{m} \cdot c_{2u} c_{2u} \qquad (6)$$

The compressor performance for ideal compression ($\eta_{is}=1.0$) can be expressed by the following equation:

$$P = \dot{m}(h_2 - h_1) \qquad (7)$$

in which:
$\dot{m}$—is the mass flow of the refrigerant in kg/s
$h_2$—is the enthalpy of the vapor at the outlet in kJ/kg
$h_1$—is the enthalpy of the vapor at the inlet in kJ/kg Combining (6) and (7) then yields the following relationship for the impeller speed:

$$\dot{m}(h_2 - h_1) = \dot{m} \cdot c^2_{2u}$$

$$c_{2u} = \sqrt{h_2 - h_1}$$

$$c_{2u} = c_2$$

$$c_2 = \sqrt{h_2 - h_1} \qquad (8)$$

For the radius of the impeller the following equation:

$$r = \frac{c_2}{2\pi \cdot n}$$

is obtained from:

$$c_2 = \omega \cdot r \quad \omega = 2\pi \cdot n \qquad (9)$$

where:
n is the rotational speed of the impeller in $s^{-1}$
$c_2$ is the impeller speed in m/s Table 2 shows the difference in enthalpy, the impeller speed and the diameter at a constant rotational speed of 60 $sec^{-1}$ for different turbocompressor refrigerants.

The enthalpy values of the vapor at the inlet to and outlet from the compressor were calculated at a vaporization temperature of 10° C., a liquefaction temperature of 30° C., superheating of 7K and subcooling of 5K for isentropic compression ($\eta_{is}=1.0$).

TABLE 2

Difference in enthalpy, impeller speed and diameter for different refrigerants at 60 $sec^{-1}$

| Variables | R11 | R123 | R365mfc |
|---|---|---|---|
| $h_2 - h_1$ in kJ/kg | 12.9 | 12.2 | 14.7 |
| $c_2$ in m/s | 113.6 | 110.5 | 121.2 |
| d in m | 0.60 | 0.59 | 0.64 |

As shown in Table 2, the calculated impeller diameters differ only slightly from one another.

R365mfc can therefore, depending on the system design and the performance requirements, replace R11 and R123 in existing turbocompressor units. In order to meet the performance requirement, e.g. the rotational speed of the system needs to be changed only slightly if R11 or R123 is replaced by R365mfc.

The design of a turbocompressor is very complex. The overall size and configuration, i.e. number and design of stages, will depend on the respective application and the refrigerant used. The design of a turbocompressor will be outlined roughly below with reference to the most important characteristic data.

EXAMPLE

On the assumption that only one stage with the same number of blades is used, the following applies in simplified form to the adiabatic head $H_{ad}$, i.e. to the work to be expended to achieve a given compression ratio:

$$H_{ad} \sim (u_2)^2 \qquad (10)$$

where $u_2$ is the peripheral velocity in m/s

For a self-selected example of application, an vaporization temperature of 10° C. with superheating of 7K and a liquefaction temperature of 30° C. with subcooling of 5K and an isentropic efficiency $\eta_{is}$ of the process of 0.75 should be achieved. The adiabatic head is calculated for R11 as 17.2 kJ/kg and for R365mfc as 19.6 kJ/kg. If these values are inserted into equation 10, then the following values are obtained for the peripheral velocities $u_2$:

$$u_{2\ R11} = 131 \text{ m/s}$$

$$u_{2\ R365mfc} = 136 \text{ m/s}$$

The flow coefficient $\phi$ of a turbocompressor should be between 0.075 and 0.04 depending on design. The impeller diameter of the compressor can be determined using the following equation:

$$d_2 = \sqrt{\frac{4 \cdot V_i}{u_2 \cdot \pi \cdot 0.06}} \qquad (11)$$

With an average flow coefficient of 0.06, the following impeller diameters $d_2$ are yielded at different inlet volumes $V_i$ for the example of application described for the refrigerants R11 and R365mfc:

$$d_{2\ R11} = 0.51 \text{ m}$$

$$d_{2\ R365mfc} = 0.68 \text{ m}$$

Monitoring the Mach number at the impeller inlet $M_{A1}$ serves to check the strength of an impeller. $M_{A1}$ should be no greater than 0.9. The Mach number at the impeller inlet is calculated from the compression ratio $p_2/p_1$ and the isentropic exponent $\chi$ as:

$$M_{AI} = 0.815 \cdot \sqrt{\frac{1}{1-\chi} \cdot \left[\left(\frac{p_2}{p_1}\right)^{\frac{\chi-1}{\chi}} - 1\right]} \quad (12)$$

The following Mach numbers are obtained for the various refrigerants using equation 12 for a diameter ratio $d_1/d_2$ of 0.5 and an entry angle $\beta_1$ of 30°:

$M_{A1\ R11}=0.67$ $M_{A1\ R365mfc}=0.76$

The strength of the impeller is therefore ensured for the quoted example and the different refrigerants. The rotational speed of the compressor is calculated using equation 13 as:

$$n = \frac{u_2 \cdot 60}{\pi \cdot d_2} \quad (13)$$

For the refrigerants R11 and R365mfc, the following speeds are obtained using equation 13:

$n_{R11}=4908$ rpm $n_{R365mfc}=3822$ rpm

R365mfc can be used in existing R11 systems with the following simplified prerequisites:
increase in the rotational speed
or increase in the number of stages
or installation of a larger impeller Since the last two points do not come into consideration in this case owing to the predetermined design, the output of the compressor can be increased only by increasing the rotational speed with the impeller diameter remaining the same at 0.51 m. The rotational speed of the R11 turbocompressor reset to R365mfc is determined according to equation 13. In this case, the speed must be increased to 5096 min$^{-1}$. This corresponds to a 4% increase in speed compared with the previous R11 system.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of cooling a material, said method comprising compressing a refrigerant consisting essentially of 1,1,1,3,3-pentafluorobutane in a turbocompressor, and allowing the compressed 1,1,1,3,3-pentafluorobutane to expand in heat exchange relation with the material to be cooled.

2. A method of converting a cooling system including a turbocompressor which uses R11 or R123 as a refrigerant, said method comprising replacing the R11 or R123 with 1,1,1,3,3-pentafluorobutane so that the refrigerant consists essentially of 1,1,1,3, 3-pentafluorobutane and increasing the rotational speed of the turbocompressor.

3. A method according to claim 2, wherein the rotational speed is increased by about 4%.

4. In a cooling system comprising a turbocompressor which compresses a refrigerant, the improvement comprising said refrigerant consisting essentially of 1,1,1,3,3-pentafluorobutane.

5. A cooling system comprising a turbocompressor which compresses a refrigerant, wherein said turbocompressor is designed to operate with R11 or R123 as refrigerant, and wherein said refrigerant consists of 1,1,1,3,3-pentafluorobutane.

6. A method of cooling a material, said method comprising compressing a refrigerant consisting essentially of 1,1,1,3,3-pentafluorobutane and at least one fluorocarbon selected from the group consisting of R245fa and R245ca in a turbocompressor, and allowing the compressed 1,1,1,3,3-pentafluorobutane to expand in heat exchange relation with the material to be cooled.

7. A method of converting a cooling system including a turbocompressor which uses R11 or R123 as a refrigerant, said method comprising replacing the R11 or R123 with 1,1,1,3,3-pentafluorobutane and at least one fluorocarbon selected from the group consisting of R245fa and R245ca so that the refrigerant consists essentially of 1,1,1,3,3-pentafluorobutane and said at least one fluorocarbon selected from the group consisting of R245fa and R245ca, and increasing the rotational speed of the turbocompressor.

8. A method according to claim 7, wherein the rotational speed is increased by about 4%.

9. In a cooling system comprising a turbocompressor which compresses a refrigerant, the improvement comprising said refrigerant consisting essentially of 1,1,1,3,3-pentafluorobutane and at least one fluorocarbon selected from the group consisting of R245fa and R245ca.

10. A cooling system comprising a turbocompressor which compresses a refrigerant, wherein said turbocompressor is designed to operate with R11 or R123 as refrigerant, and wherein said refrigerant consists of 1,1,1,3,3-pentafluorobutane and at least one fluorocarbon selected from the group consisting of R245fa and R245ca.

* * * * *